United States Patent [19]

Emmett, Jr. et al.

[11] 4,107,028
[45] Aug. 15, 1978

[54] TREATMENT OF IRON CONCENTRATE SLURRY TO IMPROVE FILTRATION

[75] Inventors: Robert C. Emmett, Jr.; Stanley D. Heden; Roger P. Summerhays, all of Salt Lake City, Utah

[73] Assignee: Envirotech Corporation, Menlo Park, Calif.

[21] Appl. No.: 763,264

[22] Filed: Jan. 27, 1977

[51] Int. Cl.² .............................................. B03B 9/00
[52] U.S. Cl. ........................................ 209/5; 209/10; 209/9; 210/52; 210/54
[58] Field of Search .................. 209/5, 10, 9, 207; 75/3, 5; 210/54 R, 68, 71, 77, 73 R, 44, 59, 75, 52; 260/535 S; 252/351, 353

[56] References Cited

U.S. PATENT DOCUMENTS

| | | |
|---|---|---|
| 3,292,780 | 12/1966 | Frommer et al. ................. 209/5 |
| 3,361,259 | 1/1968 | von der Gathen et al. ...... 210/68 X |
| 3,430,763 | 4/1969 | Iwasaki ........................... 209/10 |
| 3,915,391 | 10/1975 | Mercade ......................... 209/5 X |

OTHER PUBLICATIONS

Swan, J. D., "Improving Fine Coal Filtering", Coal Age, Nov. 1962, pp. 90-92.

Primary Examiner—Frank W. Lutter
Assistant Examiner—Ralph J. Hill
Attorney, Agent, or Firm—William S. Bernheim

[57] ABSTRACT

An improved process for filter dewatering of an iron ore concentrate slurry produced from iron ore by selective flocculation followed by flotation wherein acid and then a surface tension reducing agent of the sulfosuccinate class is added to the concentrate slurry before the slurry is filtered.

7 Claims, 1 Drawing Figure

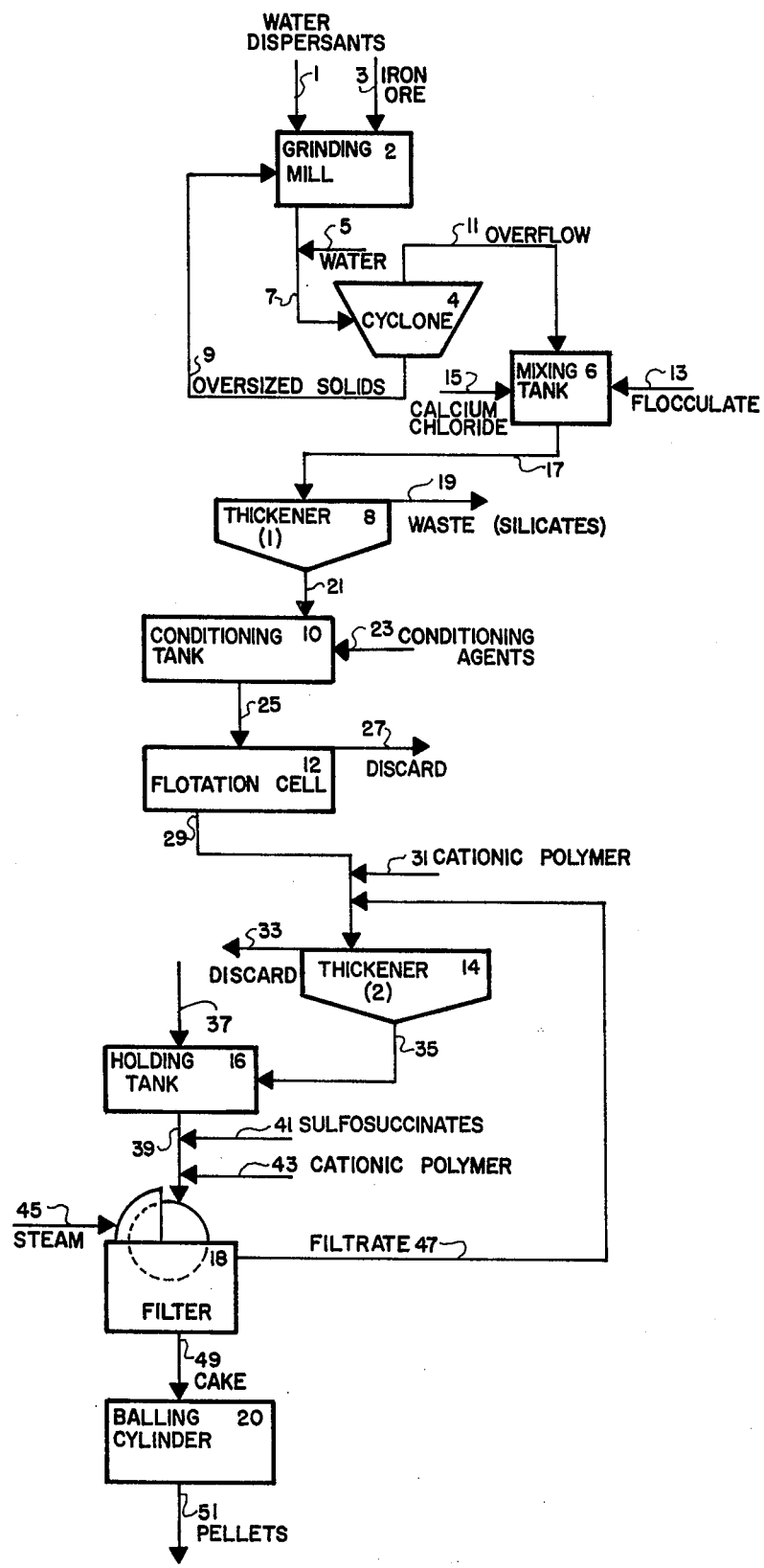

TREATMENT OF IRON CONCENTRATE SLURRY TO IMPROVE FILTRATION

BACKGROUND

This invention relates to dewatering iron ore concentrates for use in iron and steel making.

U.S. Pat. No. 3,292,780 teaches an iron benefication process in which a dispersion of finely ground iron ore of a primarily nonmagnetic type is subjected to preferential flocculation of iron oxides to remove slimed silica prior to treatment of the deslimed residue by conventional flotation methods.

Following the conventional flotation it is desirable to pelletize the iron concentrate slurry for transporting purposes. Therefore, the slurry is then thickened and filtered to dewater the slurry.

Frequently, the required dewatering for pelletization is not achieved by ordinary vacuum filtration or even steam assisted vacuum filtration.

OBJECTS OF THE INVENTION

It is an object of this invention to provide a process which provides sufficient dewatering by steam vacuum filtration to allow pelletization.

BRIEF DESCRIPTION OF THE FIGURE

Further objects and advantages of the invention will be apparent from the following detailed description, taken in conjunction with the accompanying drawing illustrating a preferred embodiment of the invention. The FIGURE is a schematic flow diagram for a process for preparing an iron ore concentrate according to the present invention.

DETAILED DESCRIPTION OF A PREFERRED EMBODIMENT

The invention will be more specifically described with reference to the flow diagram of the FIGURE. Water and dispersants (NaOH, sodium silicate) via line 1 along with iron ore, via line 3, are introduced to a grinding mill 2. The specific dispersants used, their concentration, pH etc. are not critical and will vary with the particular ore, state of the division of the ore, etc. The function of these materials is to provide a uniform dispersion of ore. The solution is normally alkaline.

It is generally preferred during grinding to operate with a pH of from about 9.5 to about 11.0, provided by addition of 1 to 3 pounds of NaOH per ton of ore. Other materials that can be used to produce the alkaline solution include KOH and $NH_4OH$ dispersants. Chemicals such as sodium phosphates have been found to provide a stable relatively nonsettling suspension. With sodium silicate the optimum quantity is generally about 1 to 3 pounds/per ton of ore. Water is usually employed in an amount to provide a slurry containing about 50% to 80% solids.

The discharge from the grinding mill 2 is diluted to 2.5 to 25% solids by addition of water via line 5 and passed via line 7 to a cyclone 4 or other classification device with oversized solids being returned via line 9 to the grinding mill 2. Finished size solids are then removed as overflow line 11 and mixed in a mixing tank 6 with flocculating materials added via line 13. Any flocculating material that causes selective flocculation of the iron oxide in preference to the silica materials may be used; examples are tapioca flour, potato starch or other flours, natural and modified starches or polyacrylamides having flocculating properties. Calcium chloride is added to mixing tank 6 via line 15 to increase the settling rates and control the amount of suspensoid.

The mixture of ore pulp suspension and flocculants are passed via line 17 to a thickener 8 where settling of iron oxides and decantation of slimes is effected. In practice, the pulp flowing to the thickener 8 typically contains about 2.5 to 25% solids, comprising up to about 2 pounds of flocculants per ton of ore. The action of these chemicals produces a rapidly settling flocculated zone comprised chiefly of iron oxide particles while retaining a suspension comprising chiefly slimed silica or silicate particles.

The suspension of silica and silicates is then removed to waste via line 19 by overflowing. However, other methods such as siphoning or decantation may be used for removal of the suspension. The flocculated solids (underflow) via line 21 are removed from the thickener 8 and transported to a conditioning tank 10 wherein conditioning agents are added via line 23 in preparation for flotation.

From the conditioning tank 10, the iron oxide containing solids are fed via line 25 to a flotation cell 12. In the flotation cell 12, the gangue is floated and the iron oxides remain in the non-float fraction. From the flotation cell, the overflow is discarded via line 27. The concentrate is fed via line 29 to a second thickener 14 wherein the iron is settled. Added to the concentrate line 29 via line 31 is a high molecular cationic polymer such as Catfloc-LV manufactured by the Calgon Company of Pittsburgh, Pennsylvania.

The overflow of the thickener 14 is discarded via line 33. The underflow of the thickener 14 typically contains from about 60 to 70% solids including iron oxides and is fed via line 35 to a holding tank 16 wherein the pH is adjusted to about 6 to about 8.5, preferably about 7 to about 7.8 by addition of acid via line 37. Suitable acids include sulfuric, hydrochloric or carbonic. Carbonic acid can be formed by bubbling carbon dioxide gas through the slurry. Neutralization with carbonic acid (dissolved $CO_2$) is equivalent to the use of sulfuric acid in its effect on filtration and avoids the build up of sulfate ion in the system which may be detrimental to the flotation step explained supra.

From the holding tank 16, the thickened slurry is fed via line 39 to a filter 18 for filtering as a means for further dewatering the slurry. Added to line 39 via line 41 is a surface tension reducing agent containing sulfosuccinates as active ingredients. Useful sulfosuccinates include those of the formula:

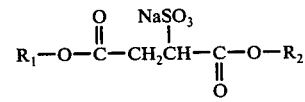

wherein $R_1$ and $R_2$ are the same or different and are branched or unbranched alkyl of four to twenty atoms. Suitable sulfosuccinates are contained in Aerodri 100 and Aerodri 104 manufactured by the American Cyanamid Company of Wayne, New Jersey. Other suitable sulfosuccinates are contained in Nalco 5 WM-436 manufactured by the Nalco Company of Hinsdale, Illinois. Aerodri 104 is added at the rate of approximately 0.5 pounds per ton of solids. Also added to the underflow of the second thickener via line 43 are polymers such as Catfloc which is described supra.

A suitable filtering apparatus is a rotary disc filter 18 with steam assisted dewatering. The resulting cake has a moisture content of less than 11 and preferably about 9½ to 10%. The discs of the filter 18 are made up of sectors. As the sectors of each filter emerge from the slurry, the sectors are enclosed in a steam hood. Dry steam via line 45 is fed to the hood to provide a steam environment in which the iron oxide cake is dewatered in part. The filtrate from the disc filters is recycled to line 29 via line 47 as a dilution liquid.

The cake formed on the disc filter 18 is passed via line 49 to a rotating balling cylinder which produces pellets. If too wet, the cake does not pelletize. If too dry, a little water is added. The pellets are removed via line 51.

We claim:

1. In a process for concentration of iron ores comprising the following sequence of steps: (1) initially forming a relatively stable alkaline aqueous dispersion of the ore; (2) treating the dispersion of ore with a flocculating agent capable of causing selective flocculation of the iron oxides in the ore in preference to silica materials; (3) allowing the flocculated iron oxides to settle; (4) separating and removing the suspended silica materials from the flocculated iron oxides; (5) subsequently subjecting an aqueous pulp of the flocculated iron oxides to a froth flotation operation in the presence of a collector to further separate iron oxides from siliceous materials; and (6) thickening the underflow of the froth flotation operation to dewater the iron oxide slurry the improvement comprising:

a. neutralizing the thickened iron oxide slurry to a pH of about 6 to 8.5 by addition of acid;
b. adding to the neutralized iron oxide slurry a surface tension reducing agent consisting essentially of sulfosuccinates;
c. filtering to form a cake from the neutralized and agent containing iron oxide slurry; and
d. dewatering the cake in a steam environment.

2. The improved process of claim 1 wherein the neutralizing is carried out by introducing carbon dioxide into the thickened iron oxide slurry.

3. The improved process of claim 1 wherein the neutralizing of the thickened iron oxide slurry is to a pH of about 7 to 7.8.

4. The improved process of claim 3 wherein the neutralizing is carried out by introducing carbon dioxide into the thickened iron oxide slurry.

5. The improved process of claim 1 wherein the sulfosiccinates are of the formula:

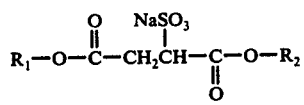

wherein $R_1$ and $R_2$ are the same or different and are branched or unbranched alkyl of four to twenty atoms.

6. The improved process of claim 5 wherein the neutralizing of the thickened oxide slurry is to a pH of about 7 to 7.8.

7. The improved process of claim 6 wherein the neutralizing is carried out by introducing carbon dioxide into the iron oxide slurry.

* * * * *